C. F. JAYNES.
LOCKING DEVICE FOR TURNBUCKLES.
APPLICATION FILED JUNE 1, 1921.

1,411,279.

Patented Apr. 4, 1922.

WITNESSES

INVENTOR
C. F. JAYNES,
BY
ATTORNEYS

UNITED STATES PATENT OFFICE.

CLAUDE FOX JAYNES, OF SEATTLE, WASHINGTON.

LOCKING DEVICE FOR TURNBUCKLES.

1,411,279.  Specification of Letters Patent.  Patented Apr. 4, 1922.

Application filed June 1, 1921. Serial No. 474,128.

*To all whom it may concern:*

Be it known that I, CLAUDE FOX JAYNES, a citizen of the United States, and a resident of Seattle, in the county of King and State of Washington, have invented certain new and useful Improvements in Locking Devices for Turnbuckles, of which the following is a specification.

My invention relates to locking devices for turnbuckles, and the purpose of my invention is the provision of a locking device of extremely simple and inexpensive construction by means of which the turnbuckle is locked so as to prevent spreading of the parts united by the buckle. My locking device is especially adapted, although not necessarily, to that type of turnbuckle employed to adjustably connect the brake rods or other parts of a railway car and to securely retain the turnbuckles against loosening when subjected to the vibrations of the car.

I will describe one form of turnbuckle and one form of locking device, each embodying my invention, and will then point out the novel features thereof in claims.

In the accompanying drawings.

Similar reference characters refer to similar parts in each of the views.

Figure 1:
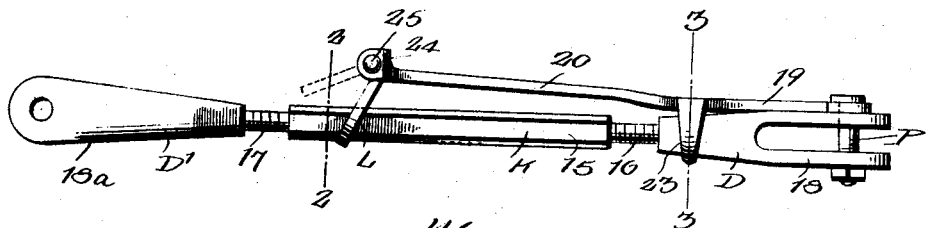
Figure 1 is a view showing in side elevation a turnbuckle having applied thereto one form of locking device embodying my invention.

Referring specifically to the drawing and particularly to Figure 1, I have here shown a conventional form of turnbuckle for connecting the brake rods or other parts of a railway car or similar vehicle, such turnbuckle in the present instance comprising a rotatable connecting member K and two connected members D and D'. The connecting member K includes an elongated body portion 15 of polygonal shape in cross section with the opposite ends thereof formed with reversely threaded extensions 16 and 17. The extensions 16 and 17 are adapted to threadedly engage the connected members D and D' so that by rotating the connecting member in one direction or the other a longitudinal adjustment of the connected members toward or away from the connecting member is effected. The connected members are of like construction, and are provided with bifurcated extensions 18 and 18ᵃ formed with openings at corresponding points to provide eyes for receiving connecting pins P. In the present instance I have only shown one connecting pin located in the connected member D.

Figure 2:
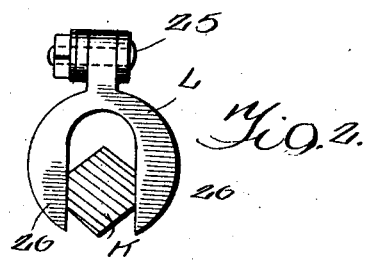
Figure 2 is a transverse sectional view taken on the line 2—2 of Figure 1.
Figure 3:
Figure 3 is a view similar to Figure 2 taken on the line 3—3 of Figure 1.
Figure 4:
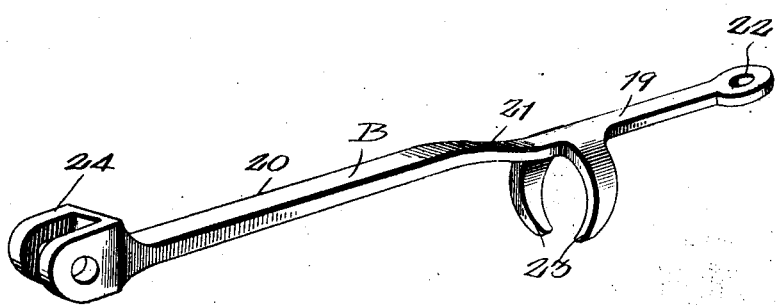
Figure 4 is an enlarged detail perspective view of the locking device with the locking dog omitted.

The locking device forming the subject matter of my invention comprises in its present embodiment a bar B having a linear portion 19 and a second linear portion 20 forming in effect a continuation of the portion 19 but offset with respect to the latter by laterally bending the bar at the point indicated at 21. The portion 19 terminates in an eye 22, while adjacent the bend 21 a pair of arcuately curved arms 23 are formed which coact to provide a guide bracket. The free end of the portion 20 terminates in a substantially U-shaped yoke 24, the parallel portions of which are formed with suitable openings to receive a pivot pin 25 (Figure 2). Swingingly supported upon the pin 25 at a point between the parallel portions of the yoke 24 is a locking pawl L which as illustrated to advantage in Figure 2 includes companion jaws 26 spaced apart to accommodate the body portion 15 of the connecting member K.

In the applied position of the locking device to the turnbuckle as shown in Figure 1, the eye 22 receives the pin 25 with the guide bracket 23 embracing the connected member D. In this position of the bar the portion 19 lies contiguous to the member D while the portion 20 is spaced from the connecting member K so that the locking pawl L can be swung to embrace the body portion 15 in the manner shown in Figure 2. With the locking device so applied the bar B is secured to the connected member D and as the pawl L embraces the connecting member K, it will be clear that rotation of one member with respect to the other is prevented thus effecting a locking of the turnbuckle. The locking device is preferably permanently attached to the turnbuckle by the pin P, and when it is desired to readjust the turnbuckle, the member K can be rotated by swinging the pawl L to the dotted line position shown in Figure 1 and in which position the body portion 15 is disengaged so as to permit rotation of the connecting member.

Although I have herein shown and described only one form of turnbuckle and one form of locking device embodying my invention, it is to be understood that various changes and modifications may be made herein without departing from the spirit of the invention or the spirit and scope of the appended claims.

What I claim is:

1. In combination, a turnbuckle including a connecting member and connected members, and a locking device comprising a bar secured to one of the connected members, and a pawl pivoted on the bar to engage the connecting member in a manner to lock the latter against rotation with respect to the connected member upon which the bar is supported.

2. In combination, a turnbuckle including a connecting member having a polygonal shaped body portion, and connected members, and a locking device comprising a bar supported on one of the connected members, a guide bracket formed on the bar and embracing one of the connected members, and a pawl pivoted on the bar to engage or disengage said body portion for the purpose described.

3. A locking device for turnbuckles comprising a bar bent to provide an offset portion, an eye formed on one end of the bar, a guide bracket formed on the bar intermediate its ends, and a pawl pivoted on the offset portion of the bar and including companion jaws.

4. A locking device for turnbuckles comprising a bar having an offset portion and provided with an eye at one end, a guide bracket formed on the bar intermediate its ends, and a bifurcated pawl projecting from the offset portion as and for the purposes specified.

5. In combination, a turnbuckle including a connecting member and connected members, and a locking device comprising a bar secured to one of the connected members, and a pawl projecting from the bar to engage the connecting member in a manner to lock the latter against rotation with respect to the connected member on which the bar is supported.

6. In combination, a turnbuckle including a connecting member having a polygonal body portion and connected members, and a locking device comprising a bar supported at one end on one of the connected members, a guide bracket formed on the bar and embracing one of the connected members, and a pawl projecting from said bar to engage or disengage the side faces of said polygonal body portion for the purpose described.

CLAUDE FOX JAYNES.